(12) United States Patent
Weissman et al.

(10) Patent No.: US 10,056,941 B2
(45) Date of Patent: Aug. 21, 2018

(54) WIRELESS COMMUNICATION IMPAIRMENTS CORRECTION

(71) Applicant: QUALCOMM Incorporated, San Diego, CA (US)

(72) Inventors: Haim Mendel Weissman, Haifa (IL); Igor Gutman, Ramat Gan (IL)

(73) Assignee: QUALCOMM Incorporated, San Diego, CA (US)

( * ) Notice: Subject to any disclaimer, the term of this patent is extended or adjusted under 35 U.S.C. 154(b) by 197 days.

(21) Appl. No.: 15/187,580

(22) Filed: Jun. 20, 2016

(65) Prior Publication Data
US 2017/0366226 A1 Dec. 21, 2017

(51) Int. Cl.
| | |
|---|---|
| *H04J 1/12* | (2006.01) |
| *H04B 3/32* | (2006.01) |
| *H04B 3/487* | (2015.01) |
| *H04L 12/26* | (2006.01) |
| *H04L 27/36* | (2006.01) |

(52) U.S. Cl.
CPC .............. *H04B 3/32* (2013.01); *H04B 3/487* (2015.01); *H04L 27/368* (2013.01); *H04L 43/16* (2013.01)

(58) Field of Classification Search
CPC .................................................... H04L 27/368
See application file for complete search history.

(56) References Cited

U.S. PATENT DOCUMENTS

| | | | | |
|---|---|---|---|---|
| 6,614,854 B1 * | 9/2003 | Chow | ............... | H04L 1/0016 330/302 |
| 7,215,716 B1 * | 5/2007 | Smith | ................... | H03F 1/3247 375/284 |
| 7,545,880 B1 * | 6/2009 | Coons | ................... | H03F 1/3258 330/149 |
| 8,243,706 B2 * | 8/2012 | Song | ........................ | H04B 7/04 342/383 |
| 8,625,711 B2 * | 1/2014 | Wang | ................... | H04B 7/0641 375/295 |
| 2003/0179830 A1 * | 9/2003 | Eidson | ................. | H04B 1/0475 375/296 |

(Continued)

OTHER PUBLICATIONS

International Search Report and Written Opinion—PCT/US2017/033569—ISA/EPO—dated Sep. 7, 2017.

(Continued)

*Primary Examiner* — Guang W Li
(74) *Attorney, Agent, or Firm* — Qualcomm IP Dept.; James Hunt Yancey, Jr.; Norton Rose Fulbright

(57) ABSTRACT

Systems and methods for providing wireless communication impairment correction using non-linear iterative precoding by a transmitter device are disclosed. The transmitter may exploit the non-linear transmit indications, and perform digital non-linear multiple input multiple output (MIMO) precoding of a transmit signal to improve the error vector magnitude (EVM) at the intended receiver device and/or reduce the adjacent channel leakage ratio (ACLR) at the unintended receiver devices. The non-linear transmit indications may comprise amplitude modulation to amplitude modulation (AM-AM) and amplitude modulation to phase modulation (AM-PM) indications. In operation, the non-linear transmit indications may be received from the intended receiver devices or may be measured by the transmitter device.

25 Claims, 9 Drawing Sheets

(56) References Cited

U.S. PATENT DOCUMENTS

| | | | |
|---|---|---|---|
| 2003/0202571 A1* | 10/2003 | Kearney | H04B 17/0087 375/224 |
| 2004/0208157 A1* | 10/2004 | Sander | H03G 3/3047 370/345 |
| 2005/0069026 A1* | 3/2005 | Vepsalainen | H03F 1/0222 375/219 |
| 2009/0252255 A1* | 10/2009 | Lee | H03F 1/3241 375/297 |
| 2009/0256630 A1* | 10/2009 | Brobston | H03F 1/3247 330/2 |
| 2010/0081397 A1* | 4/2010 | Lee | H03F 1/3241 455/108 |
| 2012/0280749 A1 | 11/2012 | Kumar | |
| 2013/0137384 A1* | 5/2013 | Desclos | H04B 1/0475 455/78 |
| 2014/0155128 A1 | 6/2014 | Dakshinamurthy et al. | |
| 2015/0015327 A1* | 1/2015 | Glock | H03F 1/3258 330/149 |
| 2015/0054579 A1* | 2/2015 | Omer | H03F 1/3247 330/149 |
| 2015/0244402 A1 | 8/2015 | Ghannouchi et al. | |
| 2015/0249929 A1 | 9/2015 | Irie et al. | |
| 2017/0359120 A1* | 12/2017 | Jacobs | H04B 10/0795 |

OTHER PUBLICATIONS

Mengali A., et al., "Joint Predistortion and PAPR Reduction in Multibeam Satellite Systems", IEEE International Conference on Communications (ICC), May 22, 2016, XP032922119, DOI: 10.1109/ICC2016.7510944, pp. 1-7.

Partial International Search Report—PCT/US2017/033569—ISA/EPO—dated Jul. 28, 2017.

Chou J., "Reducing the Design Complexity of Next-Generation Handsets," Tx/Rx Technology, Sep. 2006, pp. 28, 30 & 32.

Rongrong S., "Implementation of a low cost RF solution for LTE Pico Base Station," The Tenth International Symposium on Wireless Communication Systems, 2013, pp. 311-315.

* cited by examiner

WIRELESS COMMUNICATION IMPAIRMENTS CORRECTION

REFERENCE TO RELATED APPLICATIONS

The present application is related to U.S. provisional application Ser. No. 62/352,445, filed Jun. 20, 2016, entitled "OVER THE AIR ACQUISITION OF RADIO FREQUENCY IMPAIRMENT INFORMATION," filed concurrently herewith, the disclosure of which is hereby expressly incorporated by reference herein.

BACKGROUND

Field

Aspects of the present disclosure relate generally to wireless communication systems, and more particularly, to providing radio frequency impairments correction with respect to wireless communications.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

Radio frequency (RF) links, whether in the uplink (UL) or downlink (DL), suffer from linear and non-liner distortions resulting in error vector magnitude (EVM) in a received signal, and in power leakage to the adjacent channels. For example, the impairments with respect to any particular RF link may comprise non-linear distortions, such as due to operation of the transmit power amplifiers (PAs), as well as from linear distortions, such as due to the propagation channel (e.g., liner time invariant (LTI) impairments of the propagation channel).

Although attempts have been made to mitigate the RF link impairments, the prior solutions are not optimal in the sense of the whole non-linear (i.e., linear+non-linear) channel. The existing solutions rely on addressing the RF link impairments by using two independent digital blocks. The first such digital block is a linear precoder that is responsible for maximal exploitation of the capacity of the liner propagation channel. The second such digital block is a digital predistorter (DPD) that is responsible for predistortion, with appropriate back-off (BO), of the non-linear distortions (e.g., the non-linearities of the power amplifiers (PAs)), in order to keep the total channel as linear as possible. A significant drawback of such an approach is expressed in the requirement of high BO, resulting in low power efficiency of the power amplifier (PA) and lower emission power. The BO is used not only due to the signal quality considerations, but also to maintain a predefined adjacent channel power leakage ratio (ACLR).

SUMMARY

In one aspect of the disclosure, a method of wireless communication impairment correction is provided. The method includes obtaining, by a transmitter device, amplitude modulation to amplitude modulation (AM-AM) and amplitude modulation to phase modulation (AM-PM) indications for an intended receiver device, and performing, by the transmitter device, non-linear precoding of a transmit signal for the intended receiver device based at least in part on the AM-AM and AM-PM indications to correct the transmit signal for non-linearities in a transmit path of the transmitter device.

In an additional aspect of the disclosure, an apparatus configured for wireless communication impairment correction is provided. The apparatus includes means for obtaining, by a transmitter device, amplitude modulation to amplitude modulation (AM-AM) and amplitude modulation to phase modulation (AM-PM) indications for an intended receiver device, and means for performing, by the transmitter device, non-linear precoding of a transmit signal for the intended receiver device based at least in part on the AM-AM and AM-PM indications to correct the transmit signal for non-linearities in a transmit path of the transmitter device.

In an additional aspect of the disclosure, a non-transitory computer-readable medium having program code recorded thereon for wireless communication impairment correction is provided. The program code includes code to obtain, by a transmitter device, amplitude modulation to amplitude modulation (AM-AM) and amplitude modulation to phase modulation (AM-PM) indications for an intended receiver device, and perform, by the transmitter device, non-linear precoding of a transmit signal for the intended receiver device based at least in part on the AM-AM and AM-PM indications to correct the transmit signal for non-linearities in a transmit path of the transmitter device.

In an additional aspect of the disclosure, an apparatus configured for wireless communication impairment correction is provided. The apparatus includes at least one processor, and a memory coupled to the processor. The processor is configured to obtain, at a transmitter device, amplitude modulation to amplitude modulation (AM-AM) and amplitude modulation to phase modulation (AM-PM) indications for an intended receiver device, and to perform non-linear precoding of a transmit signal for the intended receiver device based at least in part on the AM-AM and AM-PM indications to correct the transmit signal for non-linearities in a transmit path of the transmitter device.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
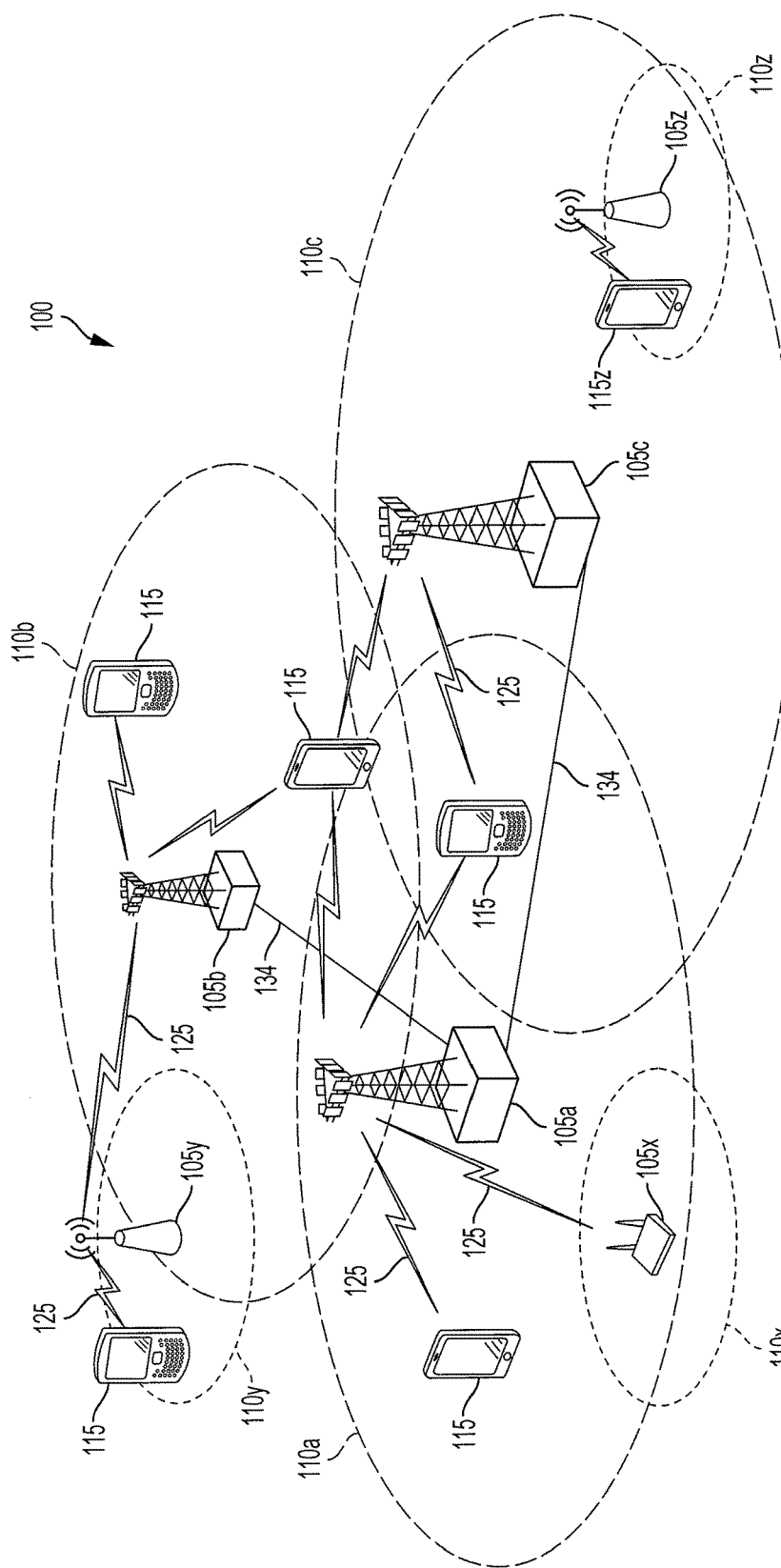
FIG. 1 is a block diagram illustrating details of a wireless communication system.

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, as well as other communications networks. As described herein, the terms "networks" and "systems" may be used interchangeably.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. For clarity, certain aspects of the apparatus and techniques may be described below for LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces.

A new carrier type based on LTE/LTE-A including unlicensed spectrum has also been suggested that can be compatible with carrier-grade WiFi, making LTE/LTE-A with unlicensed spectrum an alternative to WiFi. LTE/LTE-A, when operating in unlicensed spectrum, may leverage LTE concepts and may introduce some modifications to physical layer (PHY) and media access control (MAC) aspects of the network or network devices to provide efficient operation in the unlicensed spectrum and meet regulatory requirements. The unlicensed spectrum used may range from as low as several hundred Megahertz (MHz) to as high as tens of Gigahertz (GHz), for example. In operation, such LTE/LTE-A networks may operate with any combination of licensed or unlicensed spectrum depending on loading and availability. Accordingly, it may be apparent to one of skill in the art that the systems, apparatus and methods described herein may be applied to other communications systems and applications.

System designs may support various time-frequency reference signals for the downlink and uplink to facilitate beamforming and other functions. A reference signal is a signal generated based on known data and may also be referred to as a pilot, preamble, training signal, sounding signal, and the like. A reference signal may be used by a receiver for various purposes such as channel estimation, coherent demodulation, channel quality measurement, signal strength measurement, and the like. MIMO systems using multiple antennas generally provide for coordination of sending of reference signals between antennas; however, LTE systems do not in general provide for coordination of sending of reference signals from multiple base stations or eNBs.

In some implementations, a system may utilize time division duplexing (TDD). For TDD, the downlink and uplink share the same frequency spectrum or channel, and downlink and uplink transmissions are sent on the same frequency spectrum. The downlink channel response may thus be correlated with the uplink channel response. Reciprocity may allow a downlink channel to be estimated based on transmissions sent via the uplink. These uplink transmissions may be reference signals or uplink control channels (which may be used as reference symbols after demodulation). The uplink transmissions may allow for estimation of a space-selective channel via multiple antennas.

In LTE implementations, orthogonal frequency division multiplexing (OFDM) is used for the downlink—that is, from a base station, access point or eNodeB (eNB) to a user terminal or UE. Use of OFDM meets the LTE requirement for spectrum flexibility and enables cost-efficient solutions for very wide carriers with high peak rates, and is a well-established technology. For example, OFDM is used in standards such as IEEE 802.11a/g, 802.16, High Performance Radio LAN-2 (HIPERLAN-2, wherein LAN stands for Local Area Network) standardized by the European Telecommunications Standards Institute (ETSI), Digital Video Broadcasting (DVB) published by the Joint Technical Committee of ETSI, and other standards.

Time frequency physical resource blocks (also denoted here in as resource blocks or "RBs" for brevity) may be defined in OFDM systems as groups of transport carriers (e.g. sub-carriers) or intervals that are assigned to transport data. The RBs are defined over a time and frequency period. Resource blocks are comprised of time-frequency resource elements (also denoted here in as resource elements or "REs" for brevity), which may be defined by indices of time and frequency in a slot. Additional details of LTE RBs and REs are described in the 3GPP specifications, such as, for example, 3GPP TS 36.211.

UMTS LTE supports scalable carrier bandwidths from 20 MHz down to 1.4 MHZ. In LTE, an RB is defined as 12 sub-carriers when the subcarrier bandwidth is 15 kHz, or 24 sub-carriers when the sub-carrier bandwidth is 7.5 kHz. In an exemplary implementation, in the time domain there is a defined radio frame that is 10 ms long and consists of 10 subframes of 1 millisecond (ms) each. Every subframe consists of 2 slots, where each slot is 0.5 ms. The subcarrier spacing in the frequency domain in this case is 15 kHz. Twelve of these subcarriers together (per slot) constitute an RB, so in this implementation one resource block is 180 kHz. Six Resource blocks fit in a carrier of 1.4 MHz and 100 resource blocks fit in a carrier of 20 MHz.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 shows a wireless network 100 for communication, which may be an LTE-A network. The wireless network 100 includes a number of evolved node Bs (eNBs) 105 and other network entities. An eNB may be a station that communicates with the UEs and may also be referred to as a base station, a node B, an access point, and the like. Each eNB 105 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. In the example shown in FIG. 1, the eNBs 105a, 105b and 105c are macro eNBs for the macro cells 110a, 110b and 110c, respectively. The eNBs 105x, 105y, and 105z are small cell eNBs, which may include pico or femto eNBs that provide service to small cells 110x, 110y, and 110z, respectively. An eNB may support one or multiple (e.g., two, three, four, and the like) cells.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. In FIG. 1, a lightning bolt (e.g., communication links 125) indicates wireless transmissions between a UE and a serving eNB, which is an eNB designated to serve the UE on the downlink and/or uplink, or desired transmission between eNBs. Wired backhaul communication 134 indicate wired backhaul communications that may occur between eNBs.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

Figure 2:
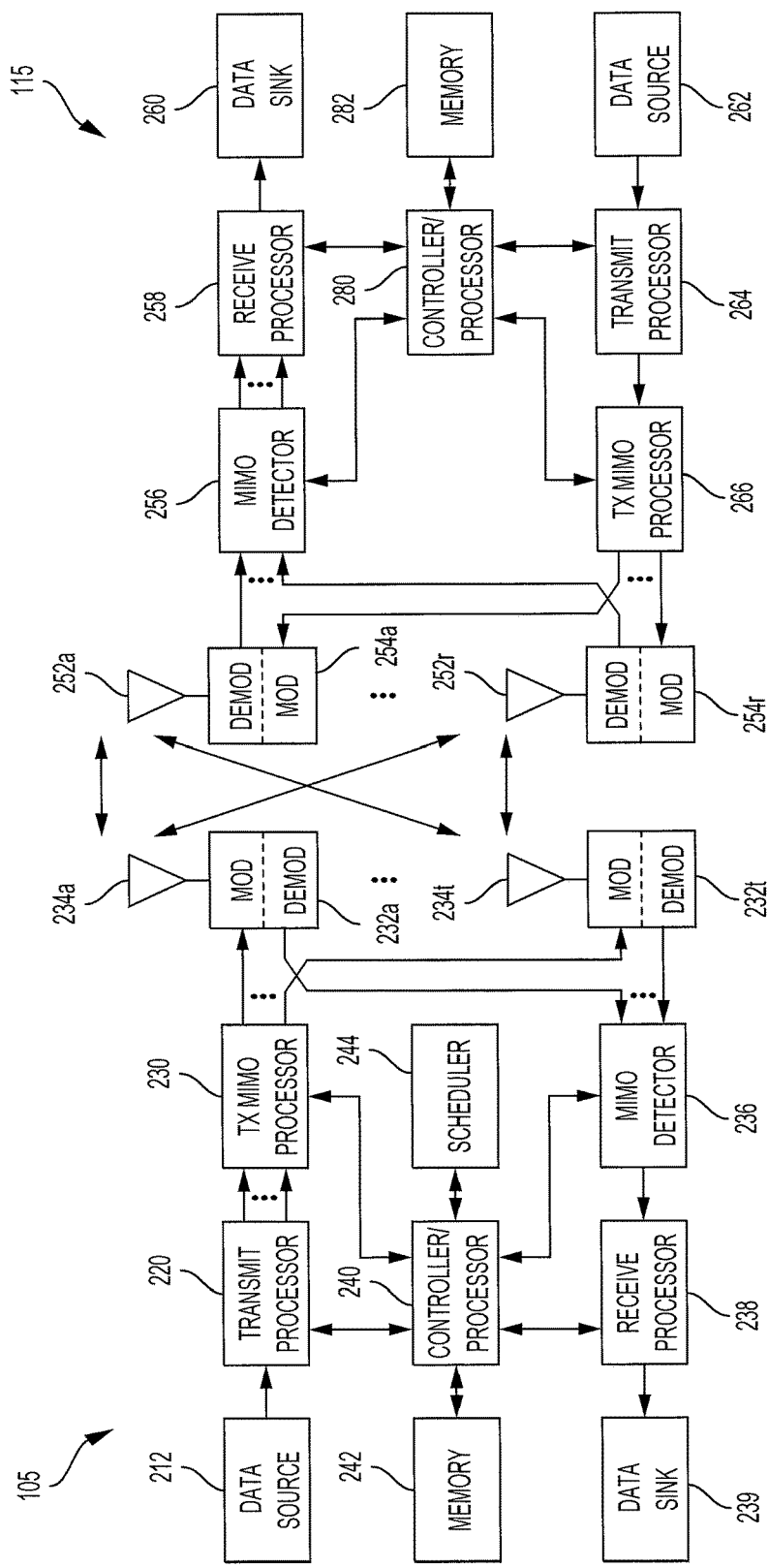
FIG. 2 is a block diagram conceptually illustrating a design of a base station/eNB and a UE configured according to one aspect of the present disclosure.

FIG. 2 shows a block diagram of a design of a base station/eNB 105 and a UE 115, which may be one of the base stations/eNBs and one of the UEs in FIG. 1. For a restricted association scenario, the eNB 105 may be the small cell eNB 105z in FIG. 1, and the UE 115 may be the UE 115z, which in order to access small cell eNB 105z, would be included in a list of accessible UEs for small cell eNB 105z. The eNB 105 may also be a base station of some other type. The eNB 105 may be equipped with antennas 234a through 234t, and the UE 115 may be equipped with antennas 252a through 252r.

At the eNB 105, a transmit processor 220 may receive data from a data source 212 and control information from a controller/processor 240. The control information may be for the PBCH, PCFICH, PHICH, PDCCH, etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the eNB 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the eNB 105. At the eNB 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the eNB 105 and the UE 115, respectively. The controller/processor 240 and/or other processors and modules at the eNB 105 may perform or direct the execution of various processes for the techniques described herein. The controllers/processor 280 and/or other processors and modules at the UE 115 may also perform or direct the execution of the functional blocks illustrated in FIG. 8, and/or other processes for the techniques described herein. The memories 242 and 282 may store data and program codes for the eNB 105 and the UE 115, respectively. A scheduler 244 may schedule UEs for data transmission on the downlink and/or uplink.

Figure 3:
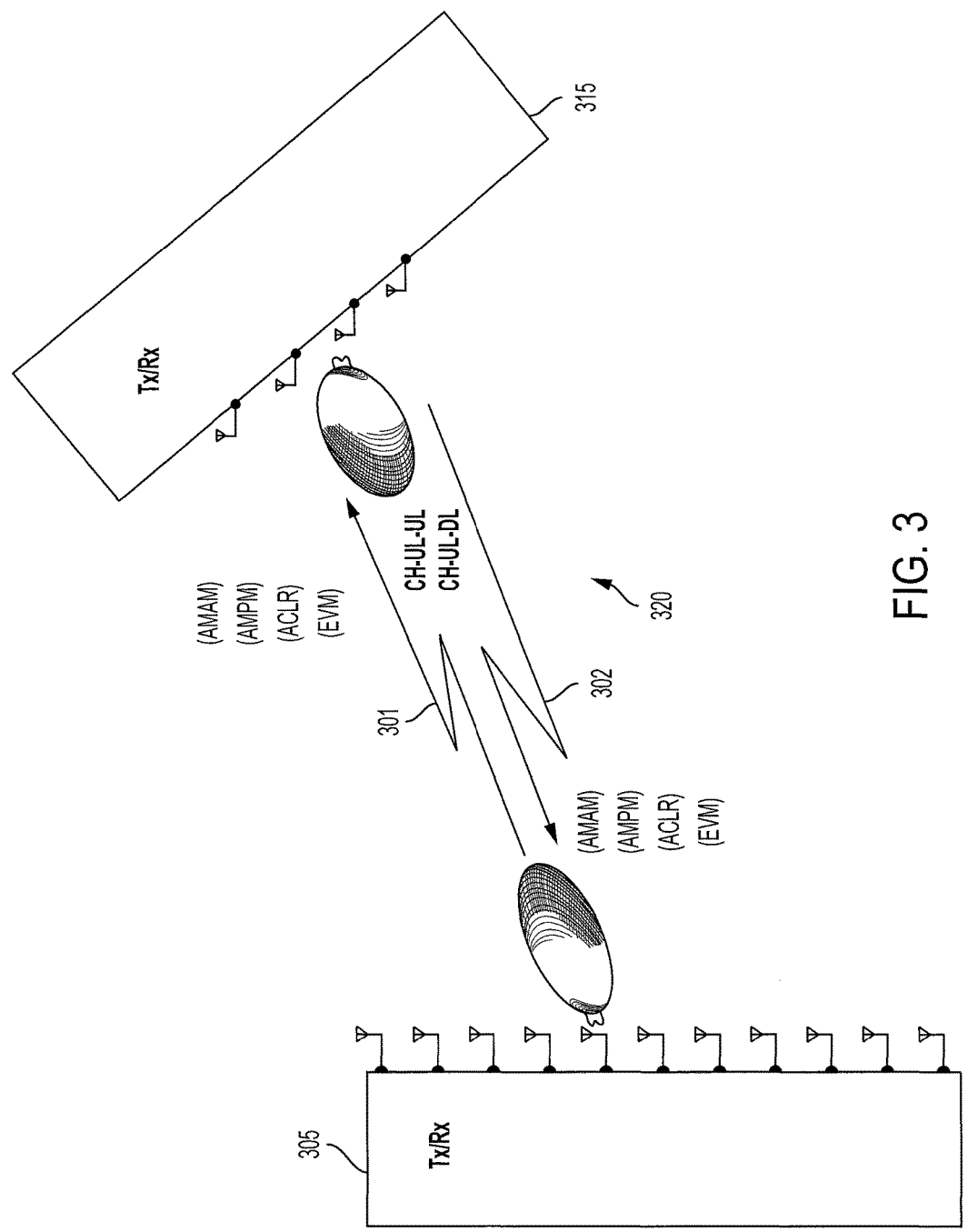
FIG. 3 is a block diagram illustrating RF links between wireless communication devices and the feedback of various indications therebetween.

As previously mentioned, RF links suffer from linear and non-liner distortions, such as linear distortions (e.g., liner time invariant (LTI) impairments due to the propagation channel) and non-linear distortions including amplitude modulation to amplitude modulation (AM-AM) and amplitude modulation to phase modulation (AM-PM) (e.g., non-linear distortions due to power amplifiers used in the transmitter). For example, RF links 301 (e.g., downlink) and 302 (e.g., uplink) between wireless device 305 (e.g., as may correspond to any of eNBs 105 or UEs 115 of wireless network 100 in FIG. 1) and wireless device 315 (e.g., as may correspond to any of UEs 115 or eNBs 105 of wireless network 100 in FIG. 1) shown in FIG. 3 may suffer from linear and non-linear distortions (e.g., distortions introduced by circuitry of wireless device 305 operating as a transmitter device, distortions introduced by propagation channel 302, etc.).

Figure 4A:
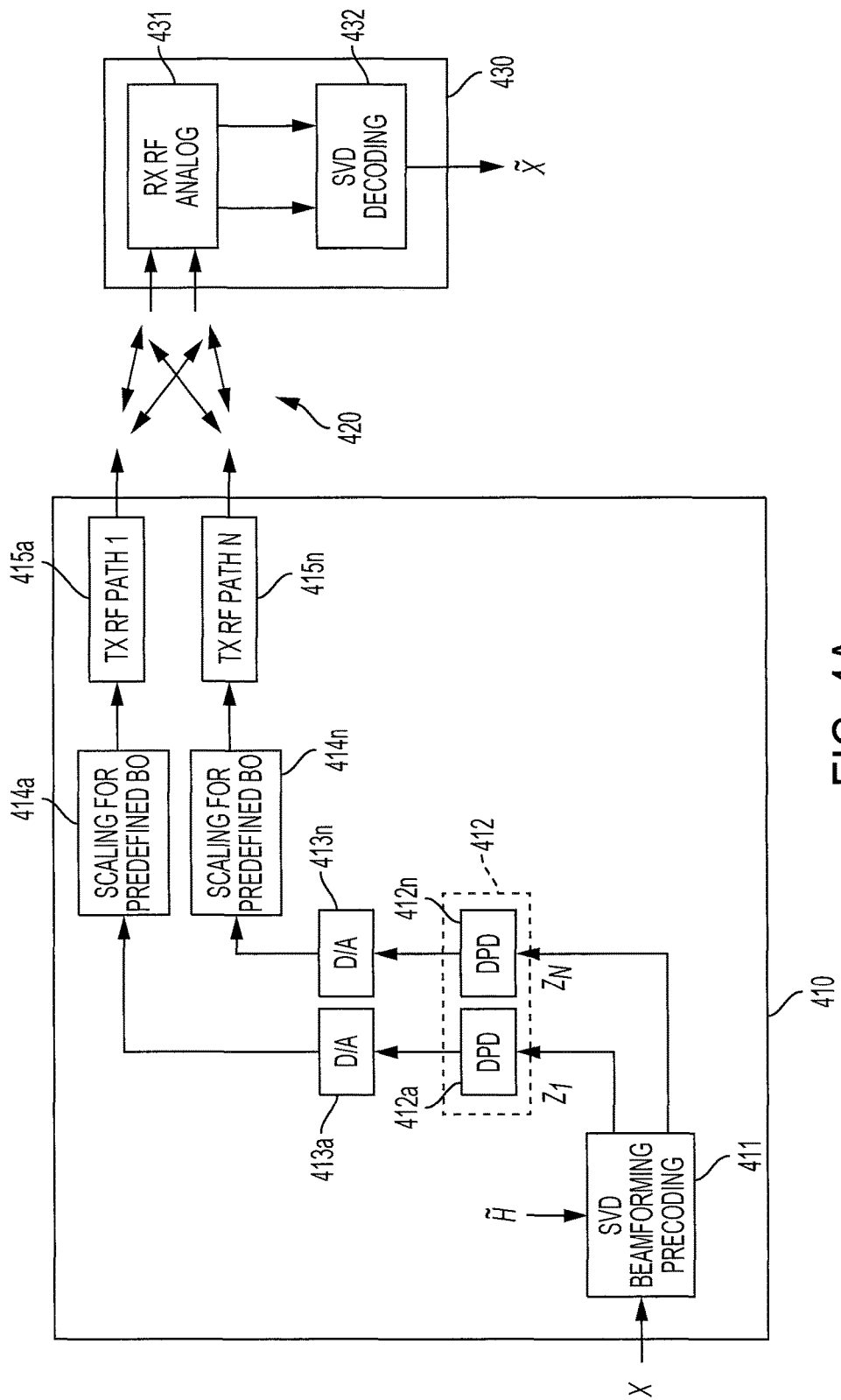
FIG. 4A is a block diagram of a conventional transmitter device implementation using two independent digital blocks.

FIG. 4A illustrates an implementation of a prior attempt to mitigate such RF link impairments. In particular, FIG. 4A includes transmitter circuitry 410, such as may comprise a portion of the circuitry of a transmitter device (e.g., eNB or UE), receiver circuitry 430, such as may comprise a portion of the circuitry of a receiver device (e.g., UE or eNB), and MIMO propagation channel 420 therebetween.

In operation, a signal (X) is provided to transmitter circuitry 410 whereby linear precoder 411 provides beamforming in accordance with the channel estimation information (H) to output the individual signals ($Z_1$, $Z_N$, etc.) for each transmit path. DPD 412 provides digital predistortion of each of the individual signals to separately predistort each signal for the nonlinearities of the PA in its respective transmit path (e.g., the PAs of transmit paths 415a-415n). Digital to analog (D/A) converters 413a-413n provide conversion of the individual signals from the digital domain to the analog domain for RF modulation and wireless transmission. Scaling circuits 414a-414n provide back-off (BO) appropriate for maintaining signal quality and adjacent channel power leakage ratio (ACLR) (e.g., the higher the BO, the less ACLR and better EVM, although the power efficiency of the PAs is decreased). RF transmit paths 415a-415n process the individual signals, such as to provide RF modulation, filtering, amplification, etc., and provides the instances of the transmit signals to a multiple channel antenna system (e.g., MIMO antenna array) of transmitter circuitry 410 for radiation of the individual transmit signals into propagation channel 420. The radiated signals, after propagating through propagation channel 420, are received by a multiple channel antenna system (e.g., MIMO antenna array) of receiver circuitry 430 for providing the individual receive signals for signal processing (e.g., by RF analog circuitry 431 and beamforming decoding circuitry 432) to recover the signal (X).

As can be seen from the configuration of FIG. 4A, the existing solution relies on addressing the RF link impairments by using two independent digital blocks. The first such digital block is linear precoder 411 that is responsible for maximal exploitation of the capacity of the liner propagation channel (e.g., by providing singular value decomposition (SVD) beamforming precoding of the transmit signal). The second such digital block is digital predistorter (DPD) 412, comprising a DPD for each transmit path (e.g., DPD 412a for first MIMO transmit path 415a, DPD 412n for second MIMO transmit path 415n, etc.) that is responsible for predistortion, with appropriate back-off (BO), of the non-linear distortions (e.g., the non-linearities of the transmit power amplifiers (PAs)), in order to keep the total channel as linear as possible.

The approach illustrated in FIG. 4A (i.e., addressing each of the problems independently by using separate optimization blocks) provides local optimal solutions to the global non-linear convex problem, which is sub-optimal in the sense of global optimality. That is, the solution is not optimal in the sense of the whole non-linear (i.e., linear+non-linear) channel.

Figure 4B:
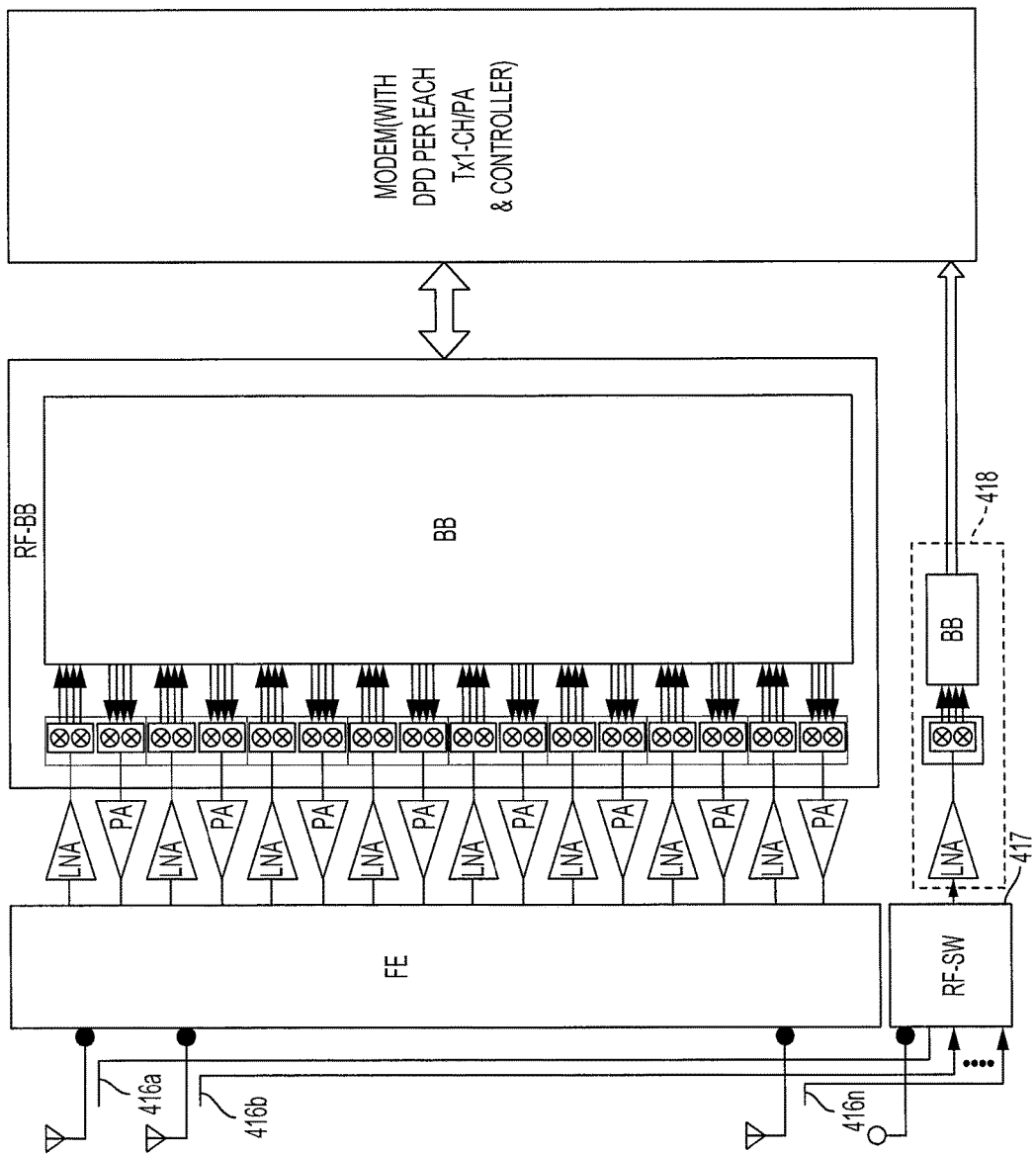
FIG. 4B is a block diagram of a conventional transmitter device implementation of a feedback receiver.

In addition to the non-global optimality of the prior solutions, such solutions also require high complexity, with the focus on optimizing each transmit path separately, require over the air calibration, and/or do not take the overall propagation channel and the overall antenna array transmission RF impairments with the antenna array impact into account. For example, implementation of the solution illustrated in FIG. 4A is based on optimization of each transmitter of the multiple output transmitters (i.e., multiple UL transmitters or multiple DL transmitters) standalone. As shown in FIG. 4B, feedback receiver (FBRx) 418 is used at the transmitting device, in combination with circuitry of transmitter device 410, wherein couplers 416a-416n and RF switch 417 are used to accommodate the different transmitter device transmission paths (e.g., the multiple power amplifiers (PAs) feeding the multiple antennas of the MIMO antenna system). FBRx 418 and its associated circuitry introduces complexity with respect to the solution and neither provides information regarding the overall array nor provides information with respect to the propagation channel.

If optimization were to be implemented with respect to multiple transmitter device transmission paths in parallel, instead of individually (e.g., using RF switch 417), in order to obtain information regarding the overall array, a FBRx (e.g., n times FBRx 418) would need to be utilized with respect to each transmitter device transmission path. Such a configuration would result in increased complexity and power consumption and would still fail to provide information with respect to the propagation channel.

A further, and very significant drawback of the approach illustrated in FIGS. 4A and 4B is expressed in the requirement of high BO, resulting in low power efficiency of the transmit PAs and lower emission power. The BO is used not only due to the signal quality considerations (i.e., non-linearity introduced into the transmit signal), but also to maintain a predefined adjacent channel power leakage ratio (ACLR).

Transmitter circuitry of a wireless communication device (e.g., any or all of eNBs 105 and/or UEs 115 of wireless network 100) is adapted to provide an enhanced non-linear impairments correction precoder configuration. An enhanced non-linear impairments correction precoder implemented in accordance with concepts of the present disclosure exploit the total channel capacity (e.g., LTI and non-linearity). In operation, enhanced non-linear impairments correction precoders according to some aspects of the disclosure provide MIMO or beamforming (BF) non-linear precoding, operable with respect to a low BO regime that maintains a required or desired ACLR, providing EVM and capacity improvement with respect to the RF link. This is performed according to some configurations of an enhanced non-linear impairments correction precoder by exploiting cooperation between the transmit RF chains (e.g., when circuitry of one transmit RF chain is in saturation, the circuitry of the other transmit RF chains are relied upon to recover the saturated samples using available power and information about the propagation channel).

Figure 5:
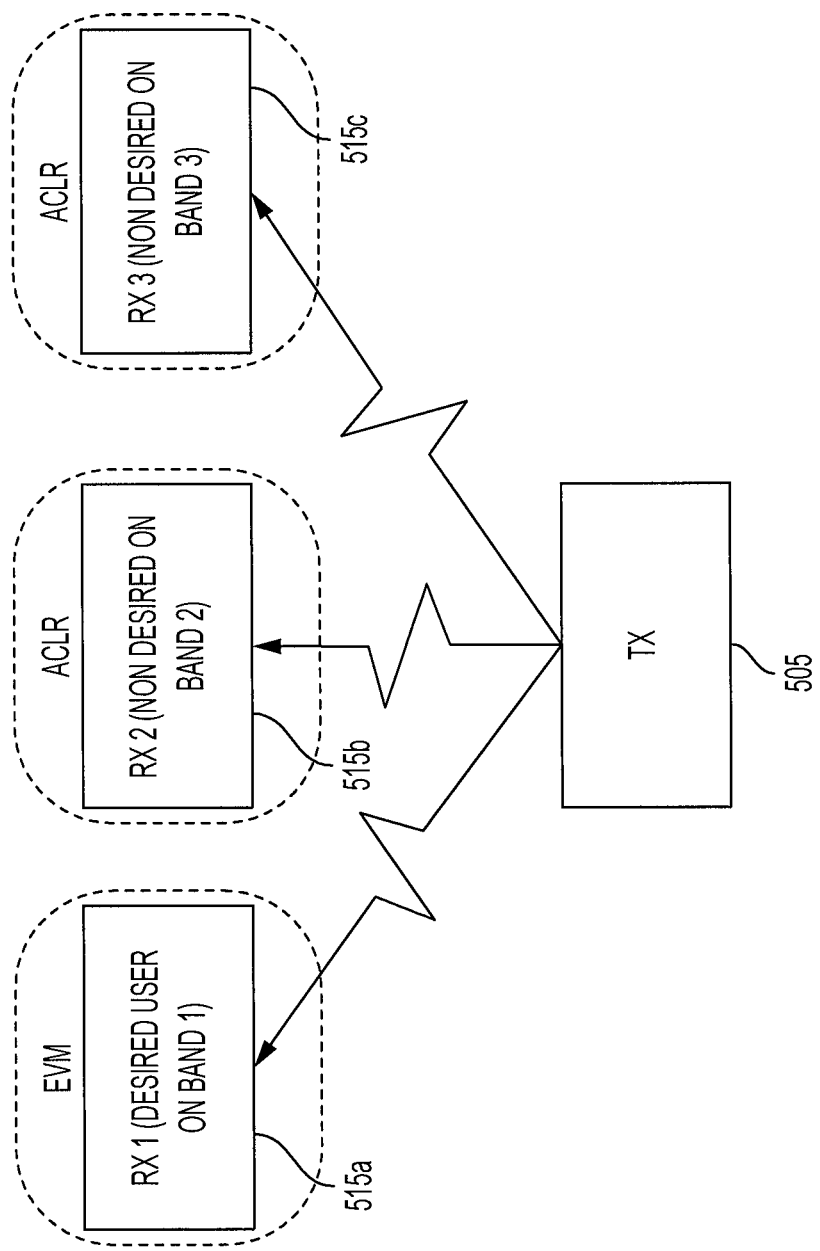
FIG. 5 is a block diagram of an enhanced non-linear impairments correction precoder configuration according to aspects of the present disclosure wherein an intended receiver device determines EVM indications and unintended receiver devices determine ACLR indications.

In implementing an enhanced non-linear impairments correction precoder configuration according to aspects of the disclosure, EVM is measured at the output of the wireless channel at the desired wireless device (e.g., wireless device 515a of FIG. 5, wherein wireless device 515a may correspond to any of UEs 115 or eNBs 105 of FIG. 1) whereas ACLR is measured at the input to the non-desired wireless device (e.g., wireless devices 515b and 515c of FIG. 5, wherein wireless devices 515b and 515c may correspond to any other ones of UEs 115 or eNBs 105 of FIG. 1). For example, wireless device 505 (e.g., as may correspond to any other one of eNBs 105 or UEs 115) may transmit signals for wireless communication with wireless device 515a, such as using beamforming to radiate the signal at the desired wireless device and null the radiation of the signal at non-desired wireless devices 515b and 515c. The receiver of desired wireless device 515a may operate to measure or estimate EVM, AM-AM, and/or AM-PM indications for each receive path (e.g., feed paths from the multiple antennas of a MIMO antenna system), possibly making measurements with respect to other indications such as channel state information (CSI) for the propagation channel, and provide any or all such information to transmitting wireless device 505 (e.g., as shown in the feedback in links 301 and 302 of FIG. 3). Additionally, the receivers of non-desired wireless devices 515b and 515c may operate to measure ACLR (and optionally also out of band emissions Spurious) and provide that information to transmitting wireless device 505. Thus, transmitting wireless device 505 may not only know the CSI of the propagation channel, but also know the non linearities that are to be address (e.g., non-linearities of the PAs). Accordingly, an enhanced non-linear impairments correction precoder configuration according to aspects of the disclosure is adapted to provide non-linear precoding as a function of both the non-linearity in the transmitter and the wireless channel.

The feedback transmission of various information (e.g., the aforementioned EVM, AM-AM, AM-PM, CSI, and/or ACLR information) from one or more receiver wireless devices to a transmitter wireless device may be provided using low speed data communication (e.g., ultra-low speed feedback, from the receiver device to the transmitter device, may be used for the feedback of such information). For example, techniques for feedback of EVM, AM-AM, AM-PM, CSI, and/or ACLR information as shown and described in the above referenced provisional patent application entitled "OVER THE AIR ACQUISITION OF RADIO FREQUENCY IMPAIRMENT INFORMATION" may be utilized according to implementations described herein.

Figure 6:
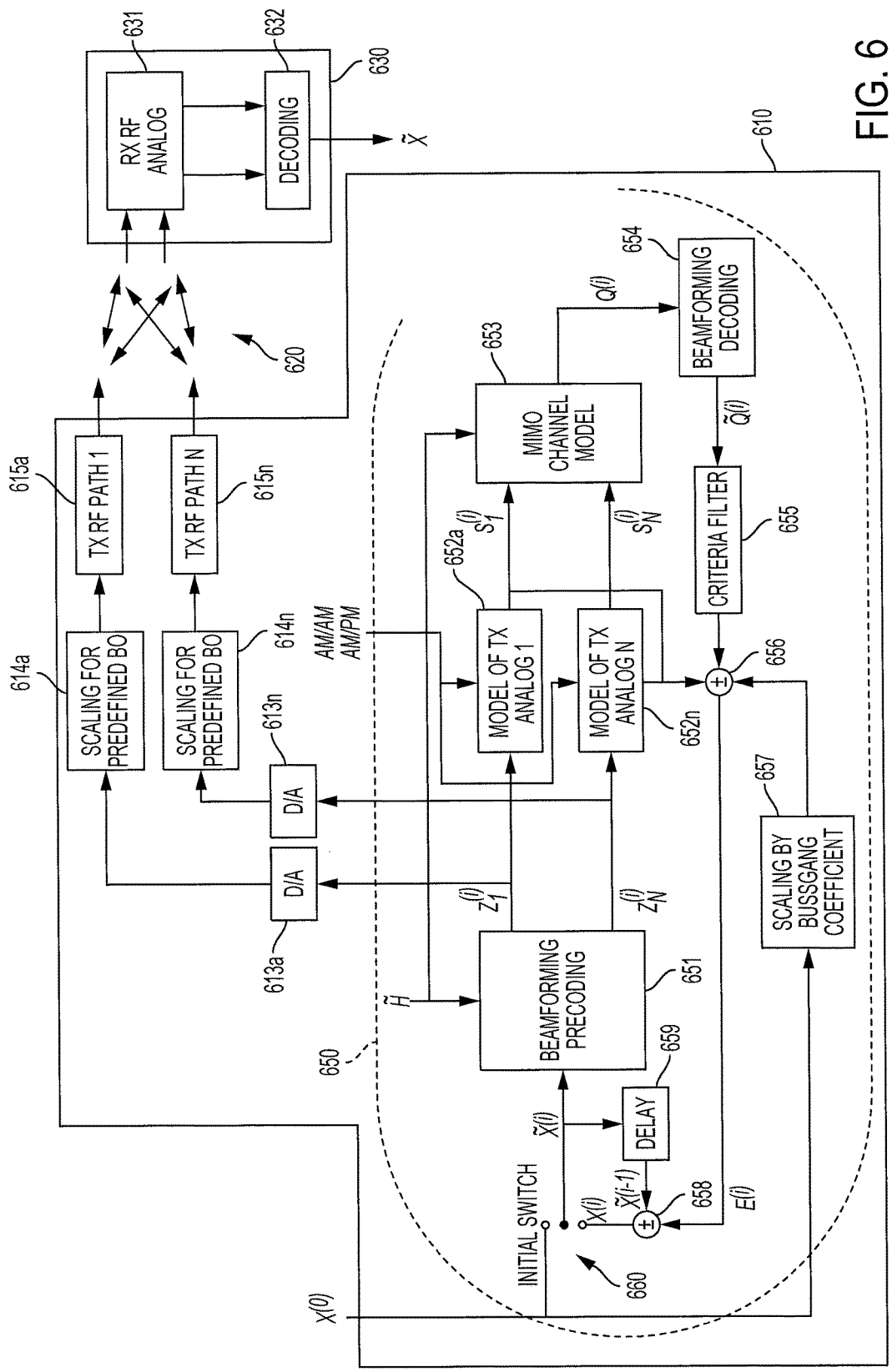
FIG. 6 is a block diagram of a transmitter device and receiver device configuration implementing an enhanced non-linear impairments correction precoder in accordance with aspects of the present disclosure.

FIG. 6 illustrates an implementation of enhanced non-linear impairments correction precoder configuration according to aspects of the disclosure. In particular, FIG. 6 includes transmitter circuitry 610, such as may comprise a portion of the circuitry (e.g., corresponding to circuitry of transmit processor 220, TX MIMO processor 230, MODs 232a-232t, and/or controller/processor 240 or transmit processor 264, TX MIMO processor 266, MODS 254a-254r, and/or controller/processor 280 of FIG. 2) of a transmitter device (e.g., wireless device 505 of FIG. 5). FIG. 6 further includes receiver circuitry 630, such as may comprise a portion of the circuitry (e.g., corresponding to circuitry of DEMODs 254a-254r, MIMI detector 256, receive processor 258, and/or controller/processor 280 or DEMODS 232a-232t, MIMO detector 236, receive processor 238, and/or controller/processor 240 of FIG. 1) of a corresponding receiver device (e.g., any of wireless devices 515a-515c of FIG. 5). Also shown in FIG. 6 is MIMO propagation channel 620 between transmitter circuitry 610 and receiver circuitry 630.

In operation, a signal ($X^{(O)}$) is provided to transmitter circuitry 610 whereby non-linear precoder 650 provides signal precoding combining predistortion and beamforming, based upon channel state information and indications of the operation of the overall array (e.g., EVM, AM-AM, AM-PM, CSI, ACLR, etc. provided in feedback from one or more receiving devices), to output the individual signals ($Z_1^{(i)}$, $Z_N^{(i)}$, etc.) for each transmit path. For example, non-linear precoder 650 may provide a modem digital block adapted to correct for both RF impairments and for propagation channel in accordance with concepts described herein. The illustrated configuration of non-linear precoder 650 saves the complexity of adding multiple feedback receiver channels and their associated added power consumption when addressing the impairments of the overall array. Moreover, non-linear precoder 650 allows for improving the overall link performance and increasing SNR and/or throughput. Implementations of non-linear precoder 650 allow for improved spectrum emission mask (SEM) of multi-element receiver devices, and may allow for the selection of specific receiver devices for which the SEM will be optimized and for which not.

Although implementations are described herein utilizing feedback of information (e.g., EVM, AM-AM, AM-PM, CSI, ACLR, etc.) from one or more receiving devices, operation of a non-linear precoder in accordance with some implementations may utilize information provided by or otherwise obtained at the transmitter device. For example, one or more FBRx (such as FBRx 418 shown in FIG. 4B) may be utilized according to some implementations to provide AM-AM and AM-PM information for non-linear precoding. As a further example, ACLR information may additionally or alternatively be obtained or estimated at the transmitter device, such as using a high complexity FBRx.

Digital to analog (D/A) converters 613a-613n of transmitter circuitry 610 provide conversion of the individual signals from the digital domain to the analog domain for RF modulation and wireless transmission. Scaling circuits 614a-614n may be utilized to provide BO, such as to assist in maintaining signal quality and/or ACLR, although it is expected that the levels of BO utilized in transmitter circuitry 631 having non-liner precoder 650 will be significantly less than that of a traditional transmitter configuration (e.g., transmitter circuitry 410 of FIG. 4). RF transmit paths 615a-615n process the individual signals, such as to provide RF modulation, filtering, amplification, etc., and provides the instances of the transmit signals to a multiple channel antenna system (e.g., MIMO antenna array) of transmitter circuitry 610 for radiation of the individual transmit signals into propagation channel 620. The radiated signals, after propagating through propagation channel 620, are received by a multiple channel antenna system (e.g., MIMO antenna array) of receiver circuitry 630 for providing the individual receive signals for signal processing (e.g., by RF analog circuitry 631 and beamforming decoding circuitry 632) to recover the signal (X).

It should be appreciated that various impairments, including linear and non-linear distortions, are introduced with respect to the signal in the process of wireless communication. For example, the PAs of RF transmit paths 615a-615n may each introduce non-linear distortion with respect to their individual signal instances. Additionally, propagation channel 620 may introduce linear distortion with respect to each signal propagating there through. Operation of the enhanced non-linear impairments correction precoder configuration provides precoding not only as a function of the wireless channel, but also as a function of the nonlinearity in the transmitter and wireless channel. In particular, the enhanced non-linear impairments correction precoder configuration illustrated in FIG. 6 uses an iterative precoder that combines both predistortion and exploitation of the properties of the channel (e.g., MIMO channel) for optimizing the mutual optimization of the total channel (i.e., the optimization is mutual, and not separate per transmission path), without the use of a DPD.

Non-linear precoder 650 in accordance with an aspect of the present disclosure operates to utilize a first branch of the transmission path to compensate a second branch of the transmission path for cases where the second branch is in saturation. As represented by the PA input and output graphs of FIG. 7, the signals to the different PAs of the transmission paths are generally different (e.g., the PAs of RF transmit paths 615a-615n of FIG. 6) and will not be in saturation at the same time. Moreover, the precoding utilized with respect to the signals of each transmission path is generally different. Non-linear precoder 650 is adapted to exploit the properties of the MIMO channel for the mutual optimization of the total channel to provide optimization that is mutual among the transmit paths. This approach enables the enhanced non-linear impairments correction precoder configuration to significantly reduce the BO used at the PAs of the transmit device.

Moreover, using the information (e.g., EVM, AM-AM, AM-PM, CSI, ACLR, etc.) provided by one or more receiver devices (e.g., the desired and/or non-desired receiver devices), non-linear precoder 650 may model the total channel and can operate to eliminate the errors in the emissions prior to their being transmitted, while maintaining ACLR at the non-desired user devices. By incorporating reported AM-AM and AM-PM indications in the transmitter model and performing multiple iterations of receiver device feedback, channel modeling based on the feedback, and precoding based on the modeling a global optimal solution that maintains the required ACLR and provides EVM and capacity improvement with respect to the RF link is provided with respect to the full array of antennas and transmit/receive paths.

In a method of operation of non-linear precoder 650 in accordance with aspects of the present disclosure, the signal provided to transmitter circuitry 610 may be initialized as $X^{(0)}=X$ and the signal provided to beamforming precoding circuitry 651 via switch 660. Eigen beamforming may be utilized by beamforming precoding circuitry 651 to precode the signal for the multiple transmission paths (e.g., beamforming for LTI impairments of the propagation channel, for directing one or more beams to illuminate a desired receiver(s), and/or for directing one or more nulls to avoid illuminating an undesired receiver(s)). For example, closed loop SVD beamforming precoding, or other suitable precoding, of the transmit signal may be implemented by beamforming precoding 651. The initial precoded signals may be transmitted to one or more receiving device (e.g., via D/A converters 613a-613n, scaling blocks 614a-614n, and RF transmit paths 615a-615n) through propagation channel 620.

The aforementioned transmitted signals as received by a multiple channel antenna system (e.g., MIMO antenna array) of receiver circuitry 630 may be analyzed by decoding circuitry 632 for measuring or estimating various communication path indications (e.g., EVM, AM-AM, AM-PM, and/or CSI indications). Such communication path indications may be feedback to non-linear precoder 650 (e.g., using a reverse channel between receiver circuitry 620 and transmitter circuitry 610) for modeling the impairments experienced in the communication path (e.g., LTI and non-linearity). For example, a protocol for feedback of overall impairments parameters, such as AM-AM, AM-PM, channel state (e.g., together with RF impairments), EVM, etc., may be utilized with respect to a transmitting and receiving device.

Non-linear precoder 650 may, for example, utilize one or more of the aforementioned communication path indications to model analog transmit paths or portions thereof (e.g., AM-AM and/or AM-PM indications to model RF transmit paths 615a-615n) by transmit path modeling circuitry 652a-652n. Additionally or alternatively, non-linear precoder 650 may utilize one or more of the aforementioned communication path indications to model the MIMO propagation channel (e.g., channel estimation, H, to model propagation channel 620) by channel modeling circuitry 653. The initial beamformed signals ($Z_1^{(i)}$, $Z_N^{(i)}$, etc.) for each transmit path may be provided to transmit path modeling circuitry 652a-652n and channel modeling circuitry 653 to model the distorted signal, $Q^{(i)}$, as received the receiver device. The distorted signal, $Q^{(i)}$, may be decoded by beamforming decoding 654 to provide the distorted signal, $Q^{(i)}$, as seen at the receiver.

The distortion separation with respect to the distorted signal, $Q^{(i)}$, may be given as $Q^{(i)}=\alpha \cdot X^{(i)}+E^{(i)}$, wherein $E^{(i)}$ is error (e.g., as may be computed as described below) and $\alpha$ is a Bussgang (deconvolution) coefficient. A Bussgang coefficient valid for OFDM, or any other stationary signal, as may be utilized according to aspects of the present disclosure may be calculated as $\alpha=E(\rho \cdot F(\rho))=\int_0^\infty \rho \cdot F(\rho) \cdot f_\rho(\rho) \cdot d\rho$ for ideal predistortion given by $$\alpha = 1 - e^{-BO} + \frac{\sqrt{\pi \cdot BO}}{2} \cdot \mathrm{erf}(\sqrt{BO}).$$

For solid state power amplifiers (SSPAs), there is no closed form expression, so an offline numerical integration (as function of BO) may be utilized, wherein $$\alpha = \int_0^\infty \rho \cdot \frac{\rho}{\left(1+\left(\frac{\rho}{\sqrt{BO}}\right)^{2\rho}\right)^{\frac{1}{2\rho}}} \cdot 2 \cdot \rho \cdot e^{-\rho^2} d\rho.$$

It should be appreciated, however, that by choosing $\alpha=E(\rho \cdot F(\rho))$ according to some implementations of non-linear precoder 650, the output of any non-linearity may be separated by $y=\alpha \cdot x+d$, where $x \perp d$, and d is minimal.

From the above, an error signal including linear and non-linear impairments of the communication channel may be computed as $E^{(i)}=Q^{(i)}-\alpha \cdot X$. Non-linear precoder 650 illustrated in FIG. 6 utilizes criteria filter 655 (e.g., operable to filter for desired receiver devices for which EVM is to be optimized and undesired receiver devices for which ACLR is to be optimized, such as based upon directions and frequencies associated with the various receiver devices), summer 656 and scaling circuitry 657 to generate the aforementioned error signal, $E^{(i)}$. Having computed the error signal, non-linear precoder 650 may then provide feedback of the distortion and cancellation of the error signal via summer 658, using switch 660 and delay 659, for a next iteration ($X^{(i+1)}=X^{(i)}-E^{(i)}$) of beamforming and modeling.

In the foregoing operation, non-linear precoder 650 models, at the transmitter, what error the receiver will see due to the nonlinearity and due to the wireless channel. By performing a plurality of such iterations (e.g., 2-3 iterations), very good results with respect to the modeled error signal and corresponding cancellation of the error signal by the precoding may provide RF link impairment correction optimized for an array of antennas using precoding at the transmitter device without the use of digital pre-distortion. Further, utilizing feedback of AM-AM and AM-PM data from the receiving device to the transmitting device for implementing precoding provides RF link impairment correction without the need for over the air calibration. The RF link impairment correction implemented by non-linear precoder 650 according to some aspects of the disclosure provides optimizing the EVM for a desired receiver device using beamforming to radiate a signal at the desired receiver device and nulling the ACLR at adjacent bands with respect to the non-desired receiver devices by exploiting the information about the propagation channel.

Figure 8:
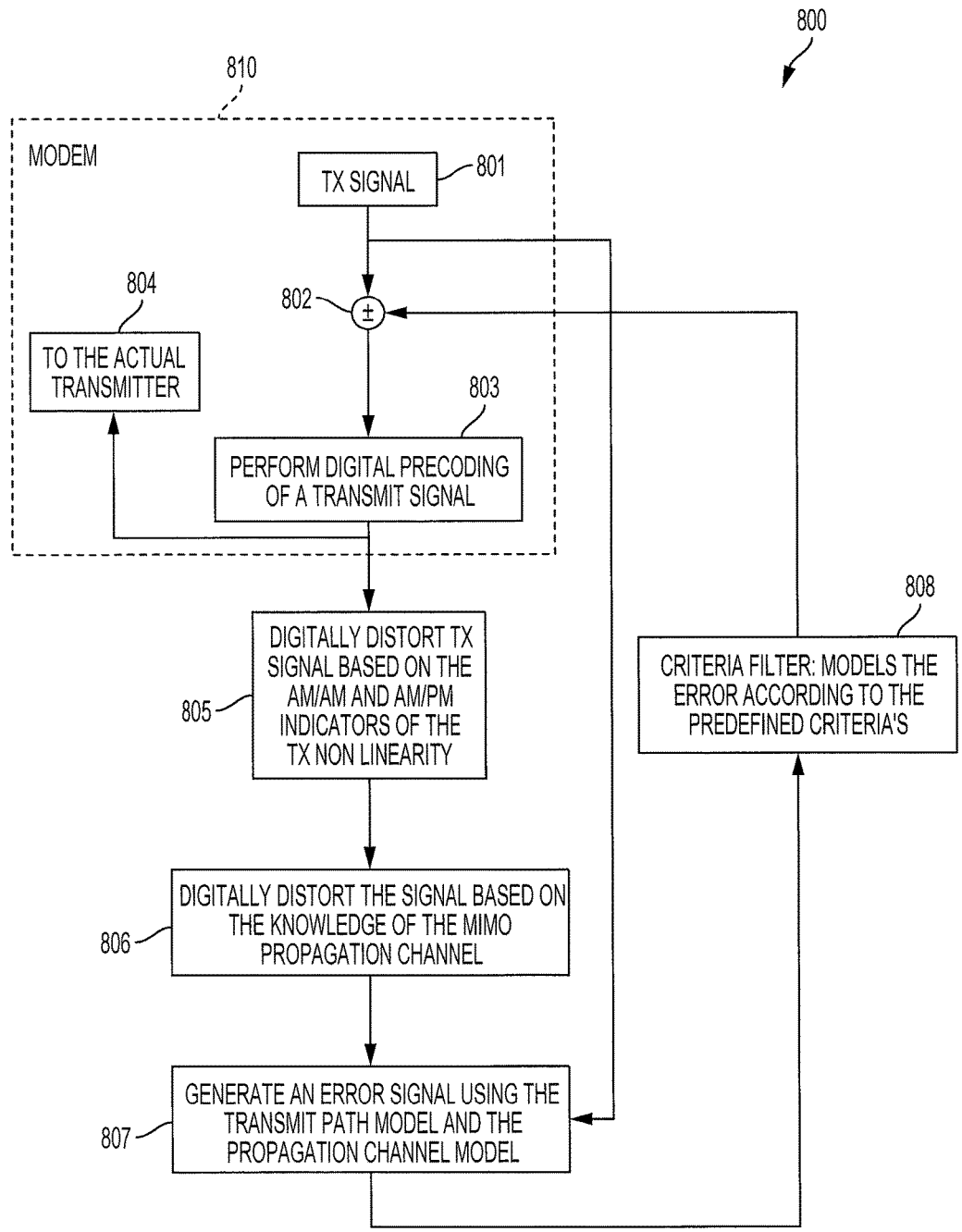
FIG. 8 is a block diagram showing a high level diagram of non-linear impairments correction operation in accordance with aspects of the present disclosure.

FIG. 8 shows a high level flow diagram, illustrating the foregoing operation of non-linear precoder 650, as flow 800. The various functions illustrated in flow 800 are exemplary of operation in accordance with aspects of the present disclosure and are provided to aid in understanding the concepts herein. It should be appreciated, however, that in addition to implementations possibly performing some of the illustrated functions in a different order, various of the functions are optional and may be omitted in accordance with some implementations. Additionally or alternatively, implementations may perform functions in accordance with the concepts described herein in addition to the functions illustrated in flow 800.

At block 801 of flow 800 a signal to be transmitted is provided at modem 810. This signal may initially be transmitted using digital linear precoding (e.g., precoding provided at block 803), such as described above with reference to FIG. 4A. For example, beamforming precoding circuitry 651 may initially operate to precode the signal for the multiple transmission paths (e.g., beamforming for LTI impairments of the propagation channel, for directing one or more beams to illuminate a desired receiver(s), and/or for directing one or more nulls to avoid illuminating an undesired receiver(s)), such as using channel estimation information, H, available to the transmitter. Where indications utilized in non-linear precoding according to aspects herein are fed back to the transmitter device by one or more receiver device, the transmit signal may initially be precoded without non-linear precoding for correcting impairments associated with such EVM indications. Alternatively, where the non-linear precoder logic operates to estimate and/or measure various indications utilized in non-linear precoding (e.g., AM-AM and AM-PM) the initial transmission of the signal may include at least some level of impairment correction as provided herein (e.g., using an error signal generated from the aforementioned estimates and/or measurements that is introduced into the transmit signal by the combining performed at block 802). After precoding of the signal by modem 810, the signal is transmitted to one or more intended receiver device at block 804.

In operation according to aspects of the present disclosure, the transmitter obtains one or more indications, such as may include AM-AM and/or AM-PM indications, for one or more intended receiver devices to provide non-linear precoding to correct the transmit signal for non-linearities in a transmit path. In operation according to some implementations, the intended receiver device determines one or more EVM indications for feedback of such information to the transmitter device. Additionally, the intended receiver device may provide feedback of CSI information to the transmitter device.

The transmitter device may also obtain information regarding one or more unintended receiver devices (i.e., receiver devices for which the transmitted signal was not intended) to provide non-linear precoding to correct the transmit signal for non-linearities and/or to maintain a predefined adjacent channel power leakage. Accordingly, in operation according to some implementations the transmitter device may receive feedback of information from unintended receiver devices. For example, one or more unintended receiver devices may operate to determine adjacent channel leakage information (e.g., ACLR indications), such as may be useful to the transmitter device in estimating the propagation channel, in determining an error signal used with respect to signal precoding, etc.

Non-linear precoder 650 implemented in accordance with aspects of the disclosure models the total channel to eliminate errors in the emissions prior to their being transmitted. Accordingly, at block 805 of flow 800, one or more of the aforementioned indications is utilized (e.g., by transmit path modeling circuitry 652a-652n) to model transmit paths, or portions thereof, of the transmitter device (e.g., to model RF transmit paths 615a-615n) and digitally distort an instance of the transmit signal. Additionally, at block 806 of the illustrated implementation, the propagation channel (e.g., MIMO propagation channel 620) is modeled (e.g., by channel modeling circuitry 653) and used to digitally distort the instance of the transmit signal. For example, channel state information fed back to the transmitter device from one or more intended receiver device may be utilized to estimate the propagation channel, wherein the channel estimate may be utilized to model the propagation channel. Additionally or alternatively, adjacent channel leakage information and/or other channel information fed back to the transmitter device from one or more unintended receiver device may be utilized to model the propagation channel.

At block 807 of flow 800 an error signal is generated using the transmit path model and the propagation channel model. Accordingly, an error signal including linear and non-linear impairments of the communication channel may be computed by the transmitter device. Having computed the error signal, non-linear precoder 650 may then provide feedback of information regarding the distortion and cancellation of the transmit signal for use in precoding of the signal. In particular, the illustrated implementation of flow 800 provides the error signal to a criteria filter (e.g., criteria filter 655) to filter the error signal for desired receiver devices for which EVM is to be optimized and undesired receiver devices for which ACLR is to be optimized at block 808 and the filtered error signal is combined with the transmit signal at block 802. Accordingly, the precoding performed in the next iteration at block 803 incorporates the indications (e.g., AM-AM and AM-PM indications) and provides non-linear precoding to correct the associated impairments. Thus, non-linear precoder 650 operating in accordance with flow 800 illustrated in FIG. 8 incorporates indications (e.g., AM-AM and AM-PM information) into modeling the total channel and may perform multiple iterations of channel modeling and precoding based on the modeling a global optimal solution to optimize the EVM for one or more intended receiver devices and/or ACLR for one or more unintended receiver devices.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Figure 7:
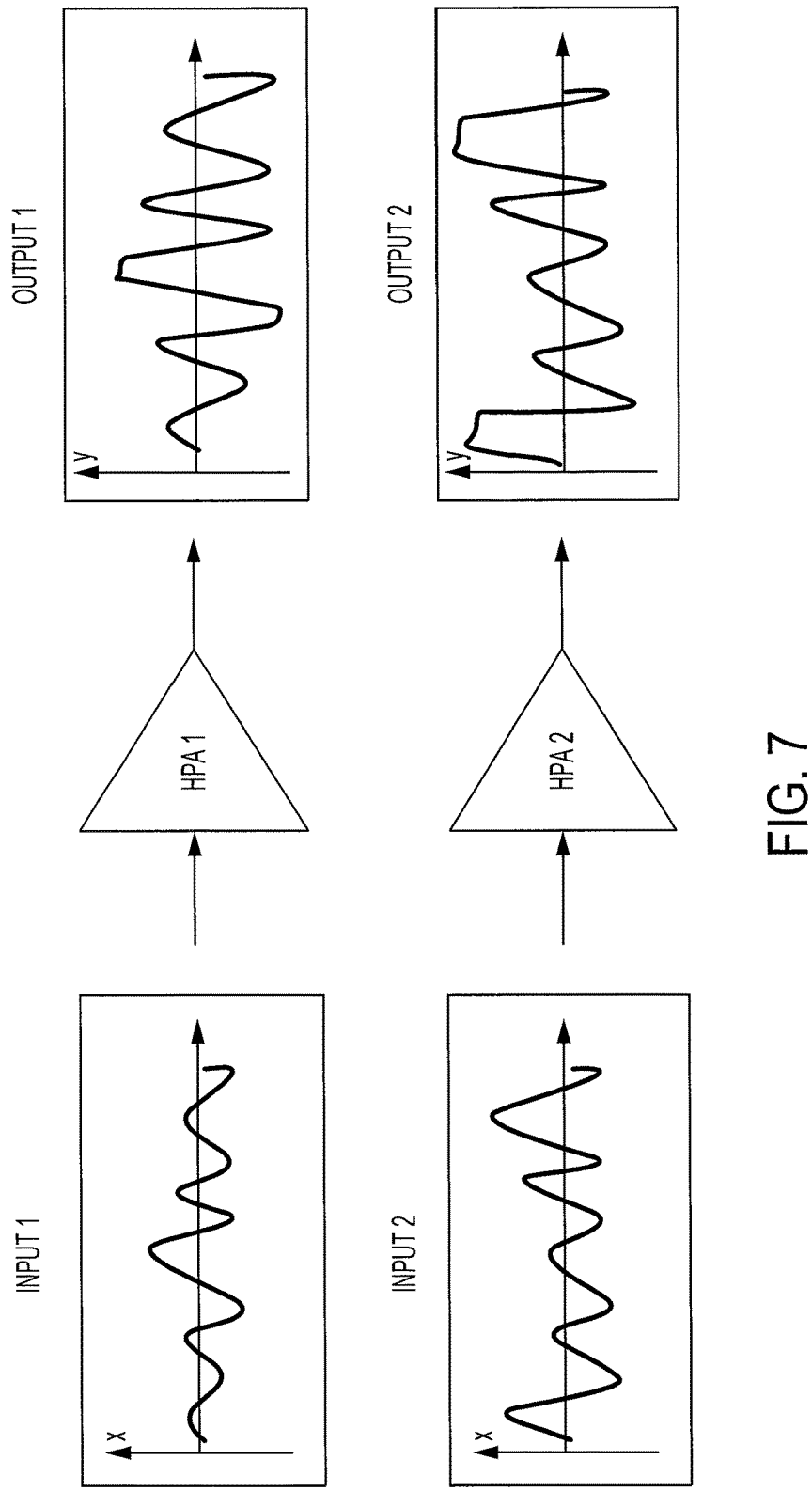
FIG. 7 illustrates operation of multiple transmission paths in a transmitter device in accordance with aspects of the present disclosure.

The functional blocks and modules in FIGS. 5-7 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication impairment correction, comprising:
    obtaining, by a transmitter device, amplitude modulation to amplitude modulation (AM-AM) and amplitude modulation to phase modulation (AM-PM) indications for an intended receiver device;
    modeling, by the transmitter device, non-linear impairments experienced by a transmit path of the transmitter device based at least on the obtained AM-AM and AM-PM indications;
    modeling, by the transmitter device, linear impairments experienced by a propagation channel based at least on the obtained AM-AM and AM-PM indications;

generating, by the transmitter device, a modeled error signal of a communication path based at least on the modeled non-linear impairments and the modeled linear impairments, wherein the communication path comprises the transmit path and the propagation channel;

performing, by the transmitter device, non-linear precoding of a transmit signal for the intended receiver device based at least in part on cancelling the modeled error signal from the transmit signal to correct the transmit signal for non-linear impairments in the transmit path and linear impairments in the propagation channel; and transmitting, by the transmitter device, the transmit signal to the intended receiver device.

2. The method of claim 1, wherein the obtaining AM-AM and AM-PM indications comprises:
receiving, by the transmitter device, at least one of the AM-AM or AM-PM indications from the intended receiver device.

3. The method of claim 1, wherein the obtaining AM-AM and AM-PM indications comprises:
determining, by the transmitter device, at least one of the AM-AM or AM-PM indications for the intended receiver device.

4. The method of claim 1, wherein the performing non-linear precoding of the transmit signal for the intended receiver device based at least in part on cancelling the modeled error signal from the transmit signal comprises:
precoding the transmit signal by a beamforming precoding circuit of the transmitter device.

5. The method of claim 4, wherein the precoding the transmit signal is performed by the beamforming precoding circuit without use of a digital predistorter (DPD) to apply digital predistortion to the transmit signal by the transmitter device.

6. The method of claim 4, wherein the transmit path comprises a plurality of transmit paths for a multiple input multiple output (MIMO) transmitter device antenna system, and wherein the precoding the transmit signal corrects the transmit signal for antenna array transmission RF impairments for an antenna system overall.

7. The method of claim 4, further comprising:
obtaining, by the transmitter device, adjacent channel power leakage indications for one or more unintended receiver devices, wherein the precoding the transmit signal includes beamforming to provide a null with respect to at least one unintended receiver device of the one or more unintended receiver devices.

8. The method of claim 7, wherein the obtaining adjacent channel power leakage indications comprises:
receiving, by the transmitter device, adjacent channel power leakage indications from one or more unintended receiver devices.

9. The method of claim 1, further comprising:
iteratively performing the generating the modeled error signal and the performing non-linear precoding of the transmit signal to provide an adjacent channel leakage ratio (ACLR) below a threshold level at one or more undesired receiver devices and to provide error vector magnitude (EVM) improvement at the intended receiver device.

10. An apparatus configured for wireless communication impairment correction, comprising:
means for obtaining, by a transmitter device, amplitude modulation to amplitude modulation (AM-AM) and amplitude modulation to phase modulation (AM-PM) indications for an intended receiver device;

means for modeling, by the transmitter device, non-linear impairments experienced by a transmit path of the transmitter device based at least on the obtained AM-AM and AM-PM indications;

means for modeling, by the transmitter device, linear impairments experienced by a propagation channel based at least on the obtained AM-AM and AM-PM indications;

means for generating, by the transmitter device, a modeled error signal of a communication path based at least on the modeled non-linear impairments and the modeled linear impairments, wherein the communication path comprises the transmit path and the propagation channel;

means for performing, by the transmitter device, non-linear precoding of a transmit signal for the intended receiver device based at least in part on cancelling the modeled error signal from the transmit signal to correct the transmit signal for non-linear impairments in the transmit path and linear impairments in the propagation channel; and means for transmitting, by the transmitter device, the transmit signal to the intended receiver device.

11. The apparatus of claim 10, wherein the means for obtaining AM-AM and AM-PM indications comprises:
means for receiving, by the transmitter device, at least one of the AM-AM or AM-PM indications from the intended receiver device.

12. The apparatus of claim 10, wherein the means for performing non-linear precoding of the transmit signal for the intended receiver device based at least in part on cancelling the modeled error signal from the transmit signal comprises:
means for precoding the transmit signal by the transmitter device.

13. The apparatus of claim 12, wherein the means for precoding the transmit signal is performed by the transmitter device without use of a digital predistorter (DPD) to apply digital predistortion to the transmit signal.

14. The apparatus of claim 12, wherein the transmit path comprises a plurality of transmit paths for a multiple input multiple output (MIMO) transmitter device antenna system, and wherein the means for precoding the transmit signal corrects the transmit signal for antenna array transmission RF impairments for an antenna system overall.

15. The apparatus of claim 12, further comprising:
means for obtaining, by the transmitter device, adjacent channel power leakage indications for one or more unintended receiver devices, wherein the means for precoding the transmit signal includes beamforming to provide a null with respect to at least one unintended receiver device of the one or more unintended receiver devices.

16. The apparatus of claim 10, further comprising:
means for iteratively performing the generating the modeled error signal and the non-linear precoding of the transmit signal to provide an adjacent channel leakage ratio (ACLR) below a threshold level at one or more undesired receiver devices and to provide error vector magnitude (EVM) improvement at the intended receiver device.

17. A non-transitory computer-readable medium having program code recorded thereon, the program code comprising:
program code for causing a computer to
obtain, by a transmitter device, amplitude modulation to amplitude modulation (AM-AM) and amplitude modulation to phase modulation (AM-PM) indications for an intended receiver device;

model, by the transmitter device, non-linear impairments experienced by a transmit path of the transmitter device based at least on the obtained AM-AM and AM-PM indications;

model, by the transmitter device, linear impairments experienced by a propagation channel based at least on the obtained AM-AM and AM-PM indications;

generate, by the transmitter device, a modeled error signal of a communication path based at least on the modeled non-linear impairments and the modeled linear impairments, wherein the communication path comprises the transmit path and the propagation channel;

perform, by the transmitter device, non-linear precoding of a transmit signal for the intended receiver device based at least in part on cancelling the modeled error signal from the transmit signal to correct the transmit signal for non-linear impairments in the transmit path and linear impairments in the propagation channel; and transmit, by the transmitter device, the transmit signal to the intended receiver device.

18. The non-transitory computer-readable medium of claim 17, wherein the program code causing the computer to obtain AM-AM or AM-PM indications comprises program code for causing the computer to receive, by the transmitter device, at least one of the AM-AM or AM-PM indications from an intended receiver device.

19. The non-transitory computer-readable medium of claim 17, wherein the program code for causing the computer to perform non-linear precoding of the transmit signal for the intended receiver device based at least in part on cancelling the modeled error signal from the transmit signal comprises program code for causing the computer to:

precode the transmit signal for beamforming.

20. The non-transitory computer-readable medium of claim 19, wherein precoding the transmit signal is performed for beamforming without use of a digital predistorter (DPD) to apply digital predistortion to the transmit signal by the transmitter device.

21. The non-transitory computer-readable medium of claim 20, wherein the program code further cases the computer to:

iteratively generate the modeled error signal and perform the non-linear precoding of the transmit signal to provide an adjacent channel leakage ratio (ACLR) below a threshold level at one or more undesired receiver devices and to provide error vector magnitude (EVM) improvement at the intended receiver device.

22. An apparatus configured for wireless communication impairment correction, the apparatus comprising:

at least one processor; and a memory coupled to the at least one processor, wherein the at least one processor is configured:

to obtain, at a transmitter device, amplitude modulation to amplitude modulation (AM-AM) and amplitude modulation to phase modulation (AM-PM) indications for an intended receiver device;

to model, at the transmitter device, non-linear impairments experienced by a transmit path of the transmitter device based at least on the obtained AM-AM and AM-PM indications;

to model, at the transmitter device, linear impairments experienced by a propagation channel based at least on the obtained AM-AM and AM-PM indications;

to generate, at the transmitter device, a modeled error signal of a communication path based at least on the modeled non-linear impairments and the modeled linear impairments, wherein the communication path comprises the transmit path and the propagation channel;

to perform, at the transmitter device, non-linear precoding of a transmit signal for the intended receiver device based at least in part on cancelling the modeled error signal from the transmit signal to correct the transmit signal for non-linear impairments in the transmit path and linear impairments in the propagation channel; and to transmit, by the transmitter device, the transmit signal to the intended receiver device.

23. The apparatus of claim 22, wherein the at least one processor configured to obtain AM-AM and AM-PM indications is configured:

to receive, at the transmitter device, at least one of the AM-AM or AM-PM indications from an intended receiver device.

24. The apparatus of claim 22, wherein the at least one processor configured to perform non-linear precoding of the transmit signal for the intended receiver device based at least in part on cancelling the modeled error signal from the transmit signal is configured:

to precode the transmit signal for beamforming.

25. The apparatus of claim 24, wherein precoding the transmit signal is performed for beamforming without use of a digital predistorter (DPD) to apply digital predistortion to the transmit signal by the transmitter device.

* * * * *